UNITED STATES PATENT OFFICE.

CARL RACH, OF CHICAGO, ILLINOIS.

PROCESS OF PREPARING WORT.

SPECIFICATION forming part of Letters Patent No. 460,989, dated October 13, 1891.

Application filed January 8, 1891. Serial No. 377,168. (No specimens.)

*To all whom it may concern:*

Be it known that I, CARL RACH, a subject of the King of Prussia, residing at Chicago, in the county of Cook and State of Illinois, have invented a certain new and useful Improvement in the Process for the Preparation of Wort, of which the following is a full, clear, and exact specification.

My invention relates to a process of preparing wort from malt and from malt and natural cereals, and has for its object to provide improvements whereby the wort shall be easily and conveniently made and shall contain a reduced quantity of malt-sugar.

I do not illustrate my invention by drawings or sketches of the apparatus employed, as the particular apparatus or machinery used is not material. Great modifications in these particulars can of course be made without materially varying the process, which is the subject-matter of this invention and application.

The usual operation is as follows: A quantity of malt is taken and mixed with water of a medium temperature and the mixture is thoroughly stirred in a mash-tub or the like until a homogeneous and thoroughly mixed mash is produced. This operation may continue from one to two hours or according to the necessity of the case, and its object is and the result should be to bring the diastase of the malt into solution. This mixture so treated when permitted to stand will separate into a thin liquid, which rises to the top of the tub, and a heavy mixture, which remains near the bottom. The thin liquid is now drawn off and kept at a low temperature. The thick mixture or mash is then subjected to a gradually-increasing temperature until the boiling-point is reached, then it is boiled for half an hour, or as required, and then cooled. In the meantime a mash of natural cereals is made as follows: A quantity of natural cereals suitably ground and moistened and crushed is mixed with from ten to sixteen per cent. of malt and with a suitable quantity of water at, say, 165° of temperature Fahrenheit. The mass is now stirred at the same temperature for about half an hour, and then the temperature of the mass is gradually raised until the steam evolved or supplied raises the pressure in the tub to from ten to forty-five pounds per square inch. This cooking is continued until the mash is converted into a gelatinous mass. This mass so prepared is now mixed with the thick mash prepared before from the malt, and the mash thus made is stirred and cooled down with water, say, to 158° of temperature Fahrenheit. One-half of the thin liquid previously prepared is now discharged into this mash and the diastase is allowed to work until the erythrodextrine reaction has completely ceased. In the meantime the remaining half of the thin liquid is heated to a boiling-point, and is then also discharged into the mash. The wort is now drawn off from this mass in the usual manner by successive sparging and drawing, and the remaining substance may be used in successive mashes.

The old methods of mashing do not separate the diastase from the malt, but allow the diastase to remain mixed with the malt and the mash. The diastase acts in the mash at temperatures in the most cases between 65° and 170° Fahrenheit, and it results in a wort containing a very high percentage of malt-sugar, in nearly all cases not less than 60 to 80 per cent. of malt-sugar. The new method separates the diastase from the malt and makes it act only at one temperature. It has the activity of the diastase in its hand and produces a wort of fifty per cent. or less malt-sugar and fifty per cent. or more dextrine. All the old methods of mashing—the German decoction method, the American and English infusion method—do not give a satisfactory yield from malt or the unmalted cereals used, because a great amount of the starch is not in a condition in which the diastase can easily act upon. The new method converts and gelatinizes all the starch before the diastase starts to act. Hence a full yield from the ingredients used is easily obtainable.

I claim—

A process for the preparation of wort, consisting of the following steps: first, making a mash of malt and separating the same into thin liquid and a thick mash; second, cooking such thick mash at the boiling-point; third, making a mash of natural cereals mixed with a small per cent. of malt and stirred and cooked under pressure; fourth, mixing, cooling, and stirring the two thick mashes above referred to; fifth, cooling this mixture and the thin liquid above referred to to about 158°

Fahrenheit and mixing half of the thin liquid with the mash; sixth, letting the mash stand until the erythrodextrine reaction has ceased; seventh, raising the temperature of the remaining thin liquid to boiling-point and then mixing it with the mash, so as to raise the temperature of the whole to 176° to 178° Fahrenheit; eighth, drawing off the wort in the ordinary manner.

CARL RACH.

Witnesses:
CELESTE P. CHAPMAN,
JEAN ELLIOTT.